United States Patent
El-Zehiry et al.

(10) Patent No.: US 10,801,944 B2
(45) Date of Patent: Oct. 13, 2020

(54) HIGH ACCURACY 5-PART DIFFERENTIAL WITH DIGITAL HOLOGRAPHIC MICROSCOPY AND UNTOUCHED LEUKOCYTES FROM PERIPHERAL BLOOD

(71) Applicant: Siemens Healthcare GmbH, Erlangen (DE)

(72) Inventors: Noha Youssry El-Zehiry, Plainsboro, NJ (US); Oliver Hayden, Moosburg (DE); Ali Kamen, Skillman, NJ (US); Lukas Richter, Hirschaid (DE); Manfred Stanzel, Berching (DE); Matthias Ugele, Neumarkt (DE); Daniela Seidel, Baiersdorf (DE); Gaby Marquardt, Hausen (DE); Oliver Schmidt, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 104 days.

(21) Appl. No.: 16/085,562

(22) PCT Filed: Jan. 26, 2017

(86) PCT No.: PCT/EP2017/051656
§ 371 (c)(1),
(2) Date: Sep. 14, 2018

(87) PCT Pub. No.: WO2017/157555
PCT Pub. Date: Sep. 21, 2017

(65) Prior Publication Data
US 2019/0195774 A1 Jun. 27, 2019

(30) Foreign Application Priority Data

Mar. 16, 2016 (EP) .................................. 16160664
Aug. 5, 2016 (EP) .................................. 16182979

(51) Int. Cl.
*G01N 15/14* (2006.01)
*G03H 1/04* (2006.01)
*G03H 1/00* (2006.01)
*G01N 15/10* (2006.01)

(52) U.S. Cl.
CPC ....... *G01N 15/1434* (2013.01); *G01N 15/147* (2013.01); *G01N 15/1429* (2013.01);
(Continued)

(58) Field of Classification Search
CPC ........... G01N 15/1429; G01N 15/1434; G01N 15/147; G01N 2015/1006;
(Continued)

(56) References Cited

U.S. PATENT DOCUMENTS 5,017,497 A 5/1991 Gerard de Grooth et al.
2014/0220622 A1 8/2014 Twardowski et al.
(Continued)

FOREIGN PATENT DOCUMENTS

CN 102278951 A 12/2011
CN 102812404 A 12/2012
(Continued)

OTHER PUBLICATIONS

Neukammer, Jörg et al.: "Reference Procedures for the Determination of Cell Concentrations in Body Fluids", in: PTB-Mitteilungen; vol. 118, 2008, Issue 4; pp. 236-242.
(Continued)

*Primary Examiner* — Hina F Ayub
(74) *Attorney, Agent, or Firm* — Dugan & Dugan, PC (57) ABSTRACT

The present invention relates to an improved method for marker-free detection of a cell type of at least one cell in a medium using microfluidics and digital holographic microscopy, as well as a device, particular for carrying out the method.

19 Claims, 3 Drawing Sheets

(52) U.S. Cl.
CPC ......... *G03H 1/0005* (2013.01); *G03H 1/0443* (2013.01); *G01N 2015/1006* (2013.01); *G01N 2015/1454* (2013.01); *G03H 2001/005* (2013.01); *G03H 2001/0445* (2013.01); *G03H 2210/20* (2013.01); *G03H 2210/55* (2013.01); *G03H 2240/56* (2013.01)

(58) Field of Classification Search
CPC ......... G01N 2015/1454; G03H 1/0005; G03H 1/0443; G03H 2001/005; G03H 2001/0445; G03H 2210/20; G03H 2210/55; G03H 2240/56

See application file for complete search history.

(56) References Cited

U.S. PATENT DOCUMENTS

| | | | |
|---|---|---|---|
| 2014/0333929 A1 | 11/2014 | Sung et al. | |
| 2014/0347672 A1* | 11/2014 | Pavillon | A61B 5/0066 356/491 |
| 2014/0376816 A1* | 12/2014 | Lagae | G01N 15/1436 382/195 |
| 2015/0238148 A1 | 8/2015 | Georgescu et al. | |
| 2016/0231225 A1 | 8/2016 | Hayden et al. | |
| 2017/0184483 A1* | 6/2017 | Bartels | G01N 15/1434 |
| 2017/0270388 A1* | 9/2017 | Vercruysse | G06K 9/00134 |
| 2018/0085562 A1 | 3/2018 | Grayzel et al. | |
| 2018/0348137 A1* | 12/2018 | Schutze | G01N 21/65 |

FOREIGN PATENT DOCUMENTS

| | | |
|---|---|---|
| DE | 10 2014200911 | 4/2015 |
| DE | 102014205535 | 10/2015 |
| EP | 1631788 B1 | 3/2007 |
| EP | 2985719 A1 | 2/2016 |
| WO | WO2015148560 A1 | 10/2015 |
| WO | WO 2015/195642 | 12/2015 |

OTHER PUBLICATIONS

Ghesu, Florin C. et al.: "Marginal Space Deep Learning: Efficient Architecture for Detection in Volumetric Image Data", in: Int. Conf. on Medical Image Computing and Computer Assisted Interventions, 2015, pp. 1-8.

Carl D. et al., "Parameter-optimized digital holographic microscope for High-resolution living-cell analysis", Applied Optics, Optical Society of America, Washington, DC; US, vol. 43, No. 36, pp. 6536-6544.

Singh, Amardeep S.G.; Anand Arun et al.: "Lateral shearing digital holographic imaging of small biological specimens", in: Optics Express, 2012, vol. 20, No. 21, pp. 23617-23622.

Marquet P. et al., "Digital holographic microscopy: a noninvasive contrast imaging technique allowing quantitative visualization of living cells with subwavelength axial accuracy", Optics Letters, Optical Society of America, vol. 30, No. 5, 2005, pp. 468-470.

Zetsche Eva-Maria et al., "Imaging-in-Flow: Digital holographic microscopy as a novel tool to detect and classify nanoplanktonic organisms", Limnology and Oceanography: Methods, vol. 12, No. 11, pp. 757-775.

Charriére, Florian et al., "Cell refractive index tomography by digital holographic microscopy", Optics Letters, Optical Society of America, vol. 31, No. 2, pp. 178-180.

Ramesh, Nisha et al.: "Isolation and two-step classification of normal white blood cells in peripheral blood smears", in: J Pathol Inform, 2012, pp. 3-13.

Vercruysee, Dries et al.: "Three-part differential of unlabeled leukocytes with a compact lens-free imaging flow cytometer"; in: Lab Chip.; 2015; vol. 15; pp. 1123-1132.

Girshovitz, Pinhas and Snaked Natan T.: "Compact and portable low-coherence interferometer with off-axis geometry for quantitative phase microscopy and nanoscopy", in: Optics Express, Mar. 11, 2013, vol. 21, No. 5, pp. 5701-5714.

Shapiro, Howard M.: "Practical Flow Cytometry", 4th Edition, Aug. 2003, pp. 278-279.

Zheng, Yefeng et al; "Four-chamber heart modeling and automatic segmentation for 3-D cardiac CT volumes using marginal space learning and steerable features"; Medical Imaging; IEEE Transaction; vol. 27; No. 11; pp. 1668-1681; 2008.

European Search Report of European Application No. 16182979.1-1553 dated Aug. 3, 2017.

International Search Report and Written Opinion of International Application No. PCT/EP2017/051656 dated May 12, 2017.

* cited by examiner

HIGH ACCURACY 5-PART DIFFERENTIAL WITH DIGITAL HOLOGRAPHIC MICROSCOPY AND UNTOUCHED LEUKOCYTES FROM PERIPHERAL BLOOD

CROSS REFERENCE TO RELATED APPLICATIONS

This is a 371 of PCT/EP2017/051656, filed Jan. 26, 2017, which claims priority to European Patent Application No. EP 16182979.1, filed Aug. 5, 2016, and European Patent Application No. EP 16160664.5, filed Mar. 16, 2016, each of which is hereby incorporated by reference herein in its entirety for all purposes.

FIELD

The present invention relates to an improved method for marker-free detection of a cell type of at least one cell in a medium using microfluidics and digital holographic microscopy, as well as a device, particular for carrying out the method.

BACKGROUND

One essential part of blood cell in-vitro diagnostics is the differentiation and counting of white blood cells (WBC). The WBC cell types are usually stated as lymphocytes, monocytes and granulocytes, which are referred to as 3-part differential of the WBC in a hematological test result. Granulocytes can be further divided into 3 types of granulocytes—neutrophils, eosinophils, and basophils. Hence, a 5-part differential refers to the 5 main white blood cell types of the peripheral blood.

With label-free methods, such as Mie scatter analysis, usually a 3-part differential is feasible, which does not allow a discrimination of the types of granulocytes. Mie scatter of individual target cells at a low and high angle is usually used to discriminate WBC for a 3-part differential. To minimize scattering of red blood cells hemolysis of the erythrocytes is performed. For a 5-part differential result one requires additional labeling of the cell nucleus and granulae to discriminate eosinophils and basophils from neutrophils. Additional labeling allows a further discrimination of the granulocytes for a 5-part differential based on scatter and absorption measurements. This method can be automated and used in hematology analyzers working as a flow cytometers.

In general, hematology analysis is performed with automated hematology analyzers, and—in case of ambiguous results (flagged results)—microscopy of Giemsa stained blood samples on a microscope slide is performed for a manual differential diagnosis. The disadvantage of automated hematology analyzers is the requirement for defined gates for data analysis, which leads to flagged samples in cases where pathologies lead to a shift of the scatter information beyond the limits of the gates. In addition, with a hematology analyzer the user has no image information which can allow X-differential information of the WBC, such as platelet-leucocyte aggregates or pathological morphologies.

Similar limitations exist for microscopy analysis of fixed and, e.g., panchromatically, stained cells on microscopy slides, which is usually limited to the analysis of 100-200 WBC maximum. However, in pathological cases WBC cell concentrations of interest can span more than five orders of magnitudes (0.1-10.000 cells/µl), which require a large blood volume for sufficient statistics on the different WBC populations. Further, Giemsa stained samples require fixation, drying and panchromatic staining of whole blood samples on a microscope slide, i.e., additional analysis steps.

Overall, a large dynamic concentration range cannot be covered by blood smear analysis having low statistical power. In addition, hematology analyzers based on impedance or Mie scatter analysis cannot provide morphological information.

U.S. Pat. No. 5,017,497 of deGrooth, Terstappen et al used as the basis for hematology counters a plot of depolarized vs. polarized side scatter discriminates unfixed, unstained eosinophil granulocytes from neutrophils, which is also described in SHAPIRO, HOWERD M.: "Practical Flow Cytometry", 4th Ed., pp. 278-9 and FIG. 7-2; 3rd Ed., pp. 236-7 and FIG. 7-2. However, in general staining is the reference method and is applied for 5-part Diff.

Further, digital holographic microscopy (DHM) has been described with regard to leukocyte discrimination, e.g., in DE 10 2014 200 911 A—incorporated herein with reference regarding leukocyte discrimination using digital holographic microscopy; VERCRUYSEE, DRIES et al.: "Three-part differential of unlabeled leukocytes with a compact lens-free imaging flow cytometer" in: Lab Chip., 2015, Vol. 15, pp. 1123—reporting a 3 part differential with DHM using fixed cells; and US 2014/0220622 A1—reporting on DHM for leukocyte differentiation without specifying how a 5 part differential can be achieved.

However, there is a need for an improved and reliable, label-free, preferably quantitative method of discriminating white blood cells in high numbers, particularly in higher throughput.

SUMMARY

The present inventors optimized a microscopic approach using microfluidics to solve the above problems and obtain a system for online monitoring and differentiating blood cells in samples of peripheral blood.

In a first aspect, the present invention relates to a method for marker-free detection of a cell type of at least one cell in a medium, comprising flowing a medium comprising at least one cell into a microfluidic device, obtaining an image of the at least one cell in the microfluidic device by a digital holographic microscopic device, wherein the image is obtained with a depth of field of less than 6 µm, and determining the cell type of the at least one cell.

The invention further relates to a device for marker-free detection of a cell type of at least one cell in a medium, comprising
- a digital holographic microscopic device with a depth of field of less than 6 µm;
- a microfluidic device; and
- a detection system configured to determine the cell type of the at least one cell.

Further aspects and embodiments of the invention are disclosed in the dependent claims and can be taken from the following description, figures and examples, without being limited thereto.

BRIEF DESCRIPTION OF THE DRAWINGS

The enclosed drawings should illustrate embodiments of the present invention and convey a further understanding thereof. In connection with the description they serve as explanation of concepts and principles of the invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

DETAILED DESCRIPTION

In a first aspect the present invention relates to a method for marker-free detection of a cell type of at least one cell in a medium, comprising flowing a medium comprising at least one cell into a microfluidic device, obtaining an image of the at least one cell in the microfluidic device by a digital holographic microscopic device, wherein the image is obtained with a depth of field of less than 6 μm, and determining the cell type of the at least one cell.

In the method as well as the present device the digital holographic microscopic device is not particularly limited, and any suitable digital holographic microscope can be used. Particularly, digital holographic microscopes that can reconstruct data from one image are preferred for high throughput.

For label-free discrimination of cells such as WBC, such as a 5-part differential and more (X-diff based on additional discrimination of aggregates, blasts, apoptotic cells; tumor cells, activated WBC, and other), digital holographic microscopy (DHM) is applied. The workflow for WBC classification can be thereby as follows: Images are obtained using transmission microscopy, and an interference phase pattern of a specimen, i.e. a cell, is recorded. From the information the image of the cell is reconstructed, and the data is analyzed for obtaining also biological information like cell compartments. Also cell concentrations can be determined, absorption, as well as further information like scattering or fluorescence information, as, e.g., described in DE 10 2014 200 911 A.

DHM in transmission or optional reflection can be performed referentially with a common beam setup, e.g., as used by Natan Shaked/Tel Aviv University, Ovizio/Belgium, Anand/University Baroda. The contrast is the result of scatter effects of subtle refractive index changes between the medium & cells as well as in between subcellular components. The quantitative and integral phase information of the subcellular components is related to the Mie scatter measurements of flow cytometry. However, the image analysis with DHM and the staining-free workflow allows performing hematology analysis of "viable" cells close to an in-vivo situation.

The digital holographic microscope works using a reference beam and detection beam which can be suitably set in different setups, e.g., on axis, off-axis, perpendicular, etc. Preferably measurement is carried out off-axis so that a simpler and more robust interference setup can be achieved and the measurement distance is short, thus minimizing noise. Thus, according to certain embodiments, a reference beam and a detection beam of the digital holographic microscopic device are off axis. Also, preferably measurement is done in transmission mode.

The depth of field is preferably 5.7 μm or less, more preferably 4.7 μm or less, e.g., 3 or 2 μm or less, particularly preferably 1.5 μm or less. With a reduced depth of field a good lateral resolution can be achieved as well, facilitating cell discrimination. At a low depth of field, further cell compartments in the cells like granulae in white blood cells can be easily observed and discriminated, allowing for improved discrimination of the cells. Also, further information like phase information can be better obtained with reduced depth of field.

The use of a microfluidic device thereby allows focusing of the cells to be detected so that they can be easily guided through a reduced depth of field so that the cells can be suitably aligned and discriminated even within the reduced depth of field and thus preferably even quantified, even in flowing conditions. A depth of field that is set too high does not achieve a suitable classification rate even using an advanced machine learning program. A higher numerical aperture of the digital holographic microscopic device must thereby not necessarily lead to improved depth of field.

According to certain embodiments, the image is obtained with a lateral resolution of less than 0.6 μm, preferably less than 0.55 μm, further preferably less than 0.52 μm, particularly 0.5 μm or less, e.g., 0.45 μm or less or even 0.4 μm or less. With improved lateral resolution more features of the cell detected can be obtained, and therewith also a magnitude of information like phase changes, etc.

The depth of field and lateral resolution can thereby depend on a number of factors of the digital holographic microscopic device, e.g., focal length, beam arrangement, the numerical aperture NA of the objective and/or illumination, the wavelength of the beam, angles at which beams are irradiated, etc., and can be suitably set.

According to certain embodiments, the detection is carried out while flowing the medium comprising the at least one cell through the microfluidic device. The flow is not particularly limited as long as the cells are flown past the digital holographic microscopic device at a speed that allows for taking an image thereof that is not blurred, which is, e.g., depending on the illumination time, etc., for obtaining an image with enough contrast. Also a flow that is too slow should be preferably avoided to achieve a sufficient throughput. The flow can be set suitably depending on parameters of the digital holographic microscopic device as well as the microfluidic device, e.g., the dimensions of the microfluidic channel(s), surface conditions thereof, etc.

According to certain embodiments, the flow in the microfluidic device is at least laminar in a region wherein the image of the at least one cell is obtained. With a laminar flow the cells can be set to a preferable orientation so that they can be easily detected. A laminar flow can be suitably set depending on, e.g., dimensions within the microfluidic device.

According to certain embodiments, the microfluidic device comprises a microchannel in the region wherein the image of the at least one cell is obtained in which the laminar flow is produced by at least one sheath flow. With a microchannel the flow can be easily set and determined, so that quantification can be simplified. Also, a sheath flow can be easily implemented in a microchannel. Preferably a sheath flow is implemented for at least two opposing sites in the microchannel to achieve a focusing of the cells to be detected. Further preferably, a sheath flow is implemented from two, particularly four—preferably perpendicular—directions in the microchannel, particularly in a rectangular microchannel (e.g. at the top, bottom, left and right), to achieve a suitable focusing and cell orientation. The sheath flows can be implemented by e.g. flowing of further microfluidic flows from different inlets compared to a main channel. Preferably, the flow speed of the speed flow does not differ too much from the flow in the main channel to avoid turbulences which could change cell orientation. Sheath flow speeds can easily and suitably be determined based on channel geometries, etc.

Preferably, the cells are focused by the flow in the microfluidic device, particularly microchannel such that the cells are guided in the middle of the depth of field of the digital holographic microscopic device.

According to certain embodiments, the microchannel comprises at least one surface, preferably at least two surfaces perpendicular to a wavefront of a reference and/or detection beam of the digital holographic microscopic device.

According to certain embodiments, the surfaces of the microchannel perpendicular to a wavefront of a reference and/or detection beam of the digital holographic microscopic device are essentially planar. This can avoid disturbances and/or reflections of the wave fronts of the reference beam and/or the detection beam, facilitating signal analysis and image reconstruction, as well as obtaining of further information like phase information essentially without adjustments in calculations due to such disturbances, reflections, etc.

According to certain embodiments, the field of view of the digital holographic microscopic device is at most 1.0 times the width of the microfluidic device in a region wherein the image of the at least one cell is obtained.

According to certain embodiments, the at least one cell is a blood cell, particularly a white blood cell. With the present method and device particularly white blood cells can be discriminated, i.e., basophils, eosinophils, neutrophils, lymphocytes and/or monocytes, further particularly all five types of white blood cells, allowing a 5-part differential. But also other cells like erythrocytes, platelets, and cell aggregates can be detected and discriminated, so that an analysis of all blood cells can be achieved.

Determination of the cell type can be done with the help of a machine learning program wherein several images in different orientations of several reference cell types can be used to train the program.

Particularly to perform image analysis for WBC differentiation, machine learning based techniques are used. In such techniques, the analysis is generally performed in two main phases: training phase and testing phase.

In the training phase, a subset of images is used to train a classifier to differentiate the different cell types. The input to the training model is a set of images that represent each category of cell to be determined, and the corresponding label to each image. The training process is aiming at constructing a model that maximizes the probability of a particular label given the corresponding image.

The output of the training process is the classification model.

In the testing phase, the model is used to classify unseen data, i.e., the input in the testing phase consists of the classification model and the input image (with unknown label), and the output is the classification label that represents the cell, e.g., the WBC type.

In the following, it is explained how data preparation for the training can be performed exemplary for the case of discriminating white blood cells—although the present invention is not limited to an analysis of white blood cells only, and then exemplary details of training and testing are provided.

First, a preprocessing pipeline can be used to prepare the training patches for the classifier training step. It can be started by thresholding the image to capture the bright spots that are high likely to be cells. After thresholding, connected component analysis can be applied to the output of the thresholding. For each connected component, the component size can be calculated, and the component can be rejected if the size is below or above predefined thresholds t1 and t2. The rejected components will be excluded in training and testing. Patches (a patch is a rectangular box including the connected component) including the remaining components can then be used to train a classifier.

According to certain embodiments, determining of the cell type of the at least one cell is carried out using a deep learning network. With such a deep learning network, orientation of the cells in the microfluidic device can be easily taken into account for cell differentiation, particularly when measuring more complex samples like peripheral blood or samples derived therefrom, e.g., fractions of whole blood, peripheral blood, etc.

The deep learning network is thereby not particularly limited.

Exemplary the use of deep learning networks is again shown for white blood cells—to which the present method is not limited, though.

To build a classifier for learning, any classifier can be used, e.g., also more recent detection methods like a Marginal Space Deep Learning (MSDL) architecture developed by GHESU FLORIN C. et al., "Marginal space deep learning: Efficient architecture for detection in volumetric image data," in MICCAI, 2015, pp. 710-718; and Zheng et al., "Four-chamber heart modeling and automatic segmentation for 3-D cardiac CT volumes using marginal space learning and steerable features", IEEE Transactions on Medical Imaging, Vol. 27, No. 11, pp. 1668-1681, 2008, to perform a 5-type classification for white blood cells. While most of the machine learning classification methods build pairwise classifiers, MSDL is inherently a multi-label classifier. Hence, the convolutional network can be directly trained for the multi-label classification problem. For example, 500 cells can be used for training, e.g., 100 for each category, and the rest of the cells for testing.

For this application, an auto-encoder convolutional neural network (CNN) or any other suitable network can be used to train the marginal space learning (MSL) classifier. The structure thereof can be, e.g., a feed-forward neural network with one (or more) hidden layer(s), used as an auto encoder (AE). Ignoring the bias term, the input and output layers have the same number of nodes.

The objective of such auto encoders is to learn a transfer function between the input layer (features that represent the images) and the output layer (the labels for the image). If the hidden layer has a size equal or larger than the input layer, potentially, an AE may learn an identity transformation. To prevent such trivial solution, previously, an AE is set up with a hidden layer with fewer nodes than the input. Recently, denoising auto-encoders (DAE) were proposed to learn more meaningful representation of the input. A certain percentage (e.g., 50%) of input nodes can be randomly picked to be disturbed (e.g., set the value to zero) and the DAE can reconstruct the original input vector given a contaminated observation. With DAE, the hidden layer may have more nodes than the input to achieve an over-complete representation. After training an AE, the output layer can be discarded and another AE can be stacked using the activation response of the already trained hidden layer as input to the new AE. This process can be repeated to train and expand a network layer by layer. After pre-training, the output of the hidden layers can be treated as high-level image features to train a classifier. Alternatively, one more layer or more can be added for the target output and the whole network can be refined using back-propagation.

A large number of features can be extracted using machine learning. These features do not necessarily correspond to physical characteristics of each cell, but can play an essential role in differentiating the cells.

To illustrate how increasing the number of features would impact the classification accuracy, scatter plots can be made that illustrate, e.g., the WBC differentiation based on two features and three features (data not shown).

In such instance, the 2D scatter plot shows that the monocytes are almost separable from the lymphocytes using the projected surface area of the cell. On the other hand, basophils are almost separable from eosinophils using the average optical height. However, eosinophils and neutrophils are overlapping based on the 2D scatter plot and cannot be easily separated, which is partially related to the fact that neutrophil populations show high heterogeneity.

When adding the cell diameter feature, in the 3D scatter plot, the separability of the eosinophils and the neutrophils becomes much better.

This is just a demonstration of how adding more features would help improve the ability to differentiate among the different cell types. Using the deep learning technology that extracts all possible features of the images can, e.g., enable a good five part differential for the different white blood cells.

In a further aspect the invention relates to a device for marker-free detection of a cell type of at least one cell in a medium, comprising
 a digital holographic microscopic device with a depth of field of less than 6 μm;
 a microfluidic device; and
 a detection system configured to determine the cell type of the at least one cell.

The device of the present invention can be particularly used in the present method, so that the components of the device can be the ones laid out with regard to the present method.

According to certain embodiments, the digital holographic microscopic device has a lateral resolution of less than 0.6 μm.

According to certain embodiments, the microfluidic device comprises a microchannel in a region wherein the image of the at least one cell is obtained, wherein the microfluidic device further comprises means to produce a laminar flow in the microchannel, e.g., using sheath flows, as laid out above.

According to certain embodiments, the detection system comprises a deep learning network, e.g., as laid out above.

EXAMPLES

The present invention will now be described in detail with reference to several examples thereof. However, these examples are illustrative and do not limit the scope of the invention.

Testing of cell discrimination has been carried out on EDTA blood obtained from healthy donors using different setups, particularly on white blood cells (WBC).

First, a Coulter counter has been used as reference method.

Figure 1:
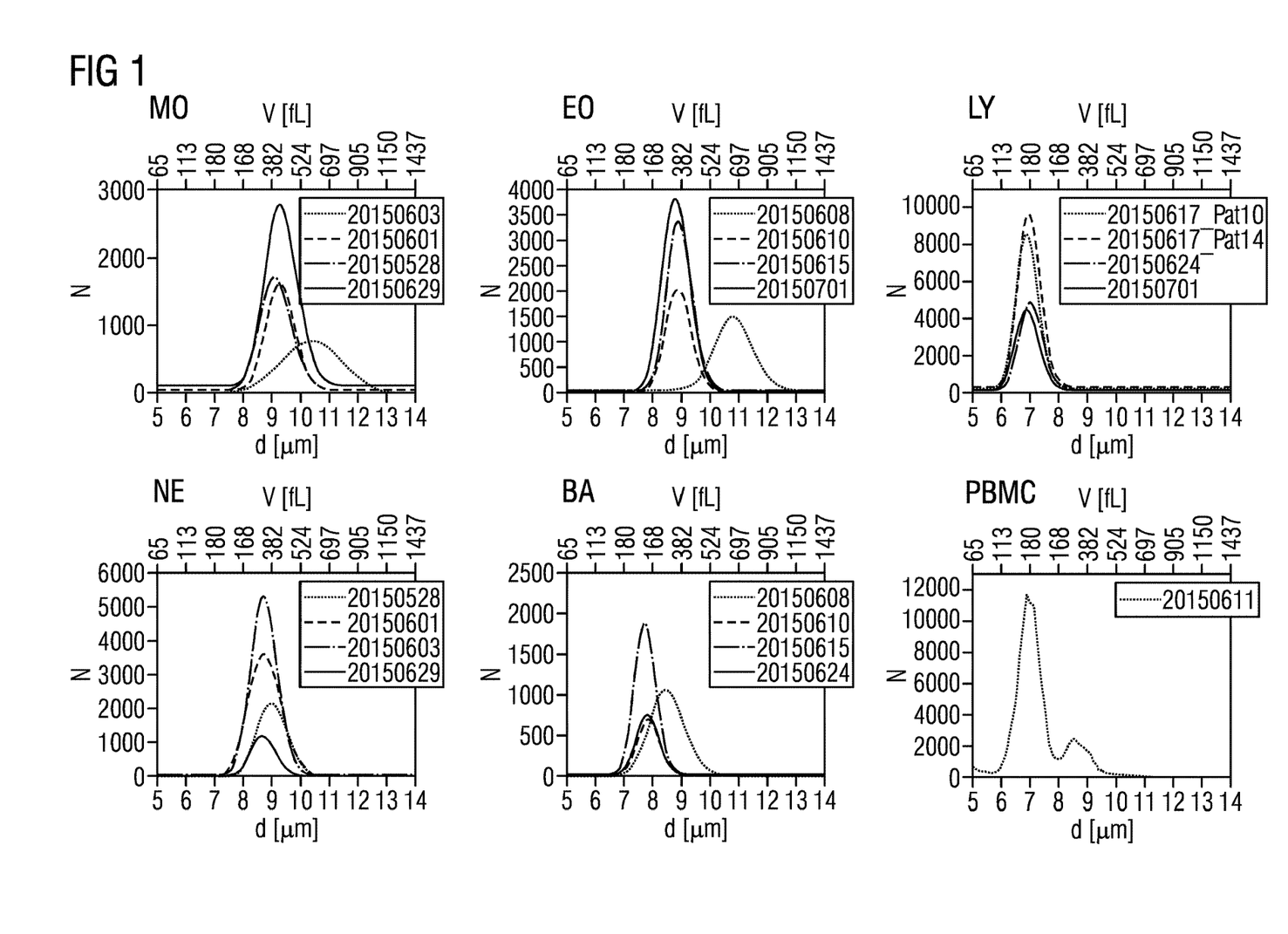
FIG. 1 shows exemplary hydrodynamic diameters and volumes of white blood cells of different donors.

FIG. 1 shows the hydrodynamic diameters d (and cell volume V) for different numbers N of WBC (basophils (BA), eosinophils (EO), monocytes (MO), neutrophils (NE), lymphocytes (LY) and in general peripheral blood mononuclear cells (PBMC)) from 4 different donors obtained with the Coulter counter, which indicates what focal depth is required to image either the whole cell volume (at low numerical aperture (NA)) or only a slice of the cell (at high NA) by DHM. The slice should be measured ideally through the center of the cell, particularly with a high probability to image the contrast-rich nucleus. This is a non-trivial task having cells on a substrate surface due to the variances of cell diameters and the respective adjustment of focusing at moderate to high NA. In a microfluidic solution with appropriate cell focusing in a laminar stream with sheath flows WBC cell centers can be aligned to each other independent of their cell diameters.

Thus, a setup with a rectangular microchannel with a channel width and depth of 50 μm and sheath flows on all four sides was subsequently used for imaging using different digital holographic microscopes. A laminar flow was set in the microchannel for online observation of the WBC. The image of the DHM covered generally the whole width of the microchannel, and in several cases an even bigger area, e.g., 130 μm×130 μm. DHM was carried out with a transmission setup in a common off-axis setup with varying NA and illumination wavelengths.

As an automated hematology analyzer needs to perform red blood cell (RBC) and WBC analysis, the following considerations were made for DHM imaging with regard to cell analysis and cell orientation in the microchannel in an automated analysis setup.

For a high-throughput DHM analyzer with a microfluidic sample transfer system a trade-off should be found to achieve both high classification yield of WBC and quantitative information on RBC. Furthermore, the system should be flexible enough to accommodate slight changes of the positioning of the blood cells in a microfluidic stream. Last, the RBC orientation preferably should be perpendicular to the optical axis, although deep network learning also enables analysis of cells oriented at angles after a corresponding training including images of such cells at an angle.

Figure 2:
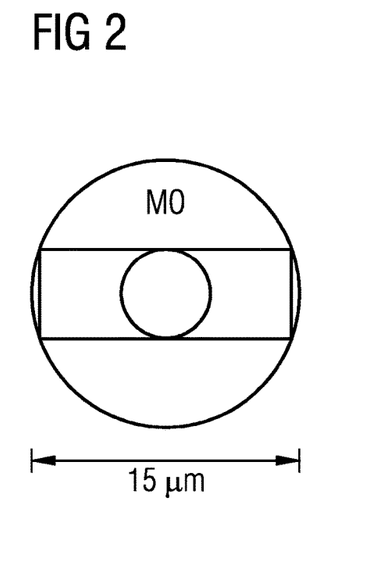
FIGS. 2 and 3 show schematically the depth of field (DOF) considerations with respect to white blood cells and their positioning in the flow cell, with considerations for the smaller lymphocytes in FIG. 2 and for larger monocytes in FIG. 3. As shown, on average a minimum ⅔ of the WBC volume should be within the physical DOF, allowing preferably a tolerance in z of about +/−2 μm with respect to the smallest leucocyte.
Figure 3:
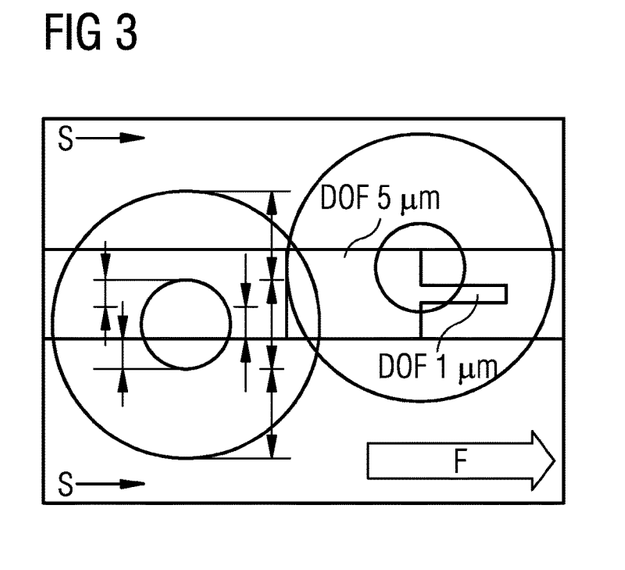

FIGS. 2 to 5 show the schematic situation for a fluidic solution with respect to size and morphology of the blood cells, as well as their positioning within the flow cell. In general, one is interested in a microfluidic condition which allows analyzing both red blood cells and white blood cells. A favorable condition is observed with a DOF of about 5 μm which can be set identical with the sample flow thickness in a microfluidic channel with laminated flows (sheath-sample-sheath flow in z-direction, i.e., along the observation beam). FIG. 2 shows considerations for different white blood cell diameters, with monocytes having a diameter of usually about 15 μm or less, whereas lymphocytes usually have a diameter of about 5 μm or more. For these cells, a DOF of about 5 μm can be achieved with an objected NA of 0.55 (e.g. a lens 40×) and illumination at 530 nm wavelength, enabling a lateral resolution of about 0.5 μm. FIG. 3 shows in a side view the positioning in a microchannel with bottom and top sheath flow S, with F showing the flow direction, and changes in the axial focusing of the cells in the microchannel and its effect on cell observation with different DOF of 5 and 1 μm, respectively. In this image, a 5 μm sample flow height in a 50 μm channel is assumed. As can be seen, a good focusing of the cells in the microchannel is advantageous, especially with smaller DOF. With laminar flow, an approximately 2-dimensional sample flow can be achieved.

With such a setup, on average min. ⅔ of the WBC volume is within the physical DOF, allowing a tolerance in z of +/−2 μm with respect to the smallest leucocyte.

Figure 4:
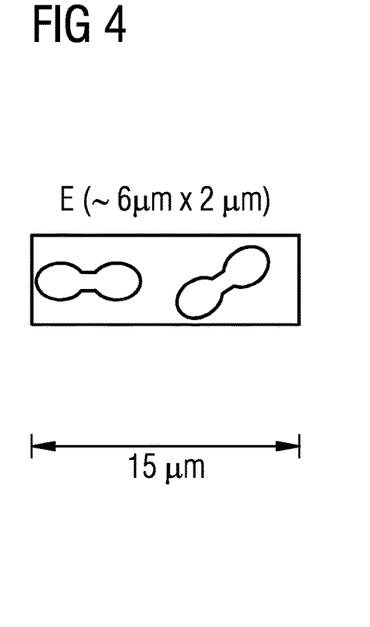
FIGS. 4 and 5 show schematically the DOF and flow cell positioning considerations for red blood cells (RBC) which fit to WBC analysis needs. An orientation effect can be achieved by laminar flow.
Figure 5:
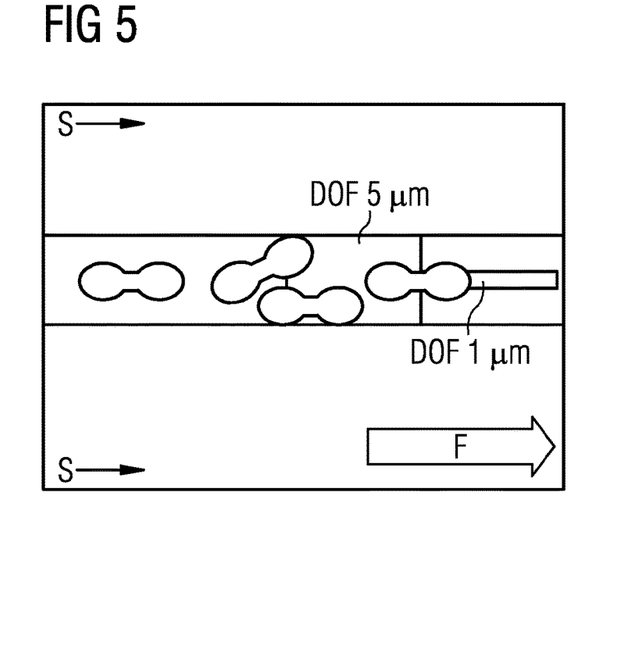

Similar considerations as in FIGS. 2 and 3 can be also made for erythrocytes E, as shown in FIGS. 4 and 5. Again, a DOF of about 5 μm can be achieved with an objected NA of 0.55 (e.g. a lens 40×) and illumination at 530 nm wavelength, enabling a lateral resolution of about 0.5 μm, which is assumed in this picture as well. For the erythrocytes, dimensions of ~6 μm×2 μm are assumed with the usual shape thereof shown in cross-section.

Further, also the influence of observation of such cells at an angle is indicated with one red blood cell being flown at an angle. An orientational effect is achieved by a laminated flow with a sheath flow velocity bigger than the sample flow velocity.

Figure 6:
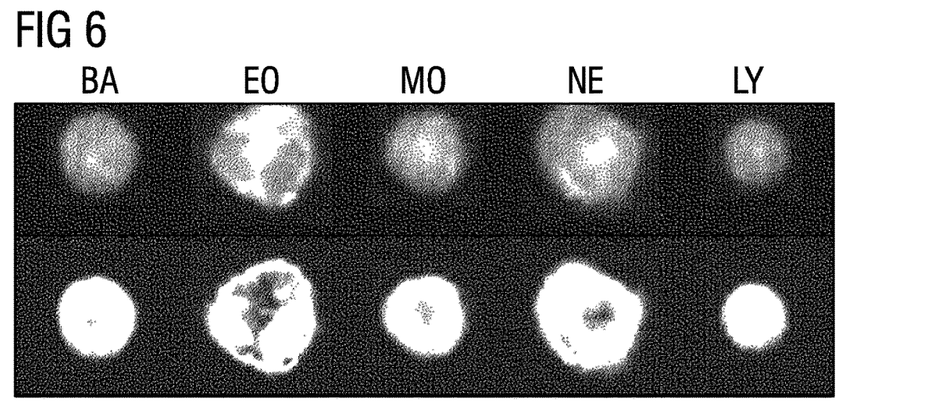
FIGS. 6 to 8 show WBC images acquired with off-axis DHM systems using different wavelengths, objective & illumination numerical aperture (NA) and different lateral resolutions.
Figure 7:
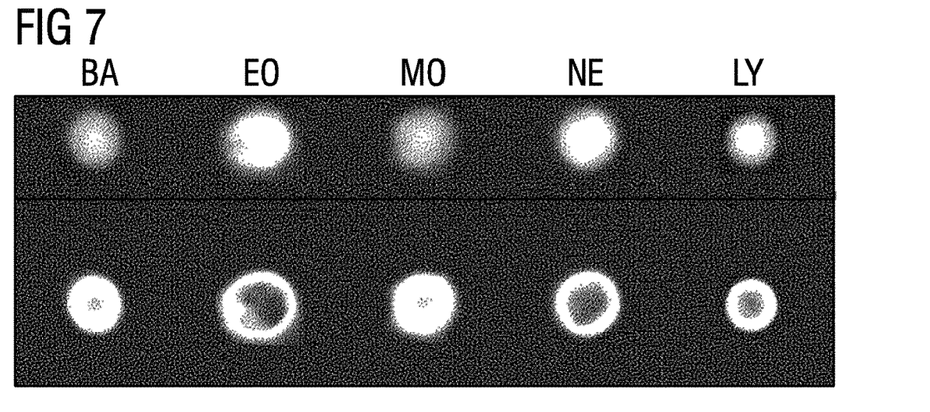
Figure 8:
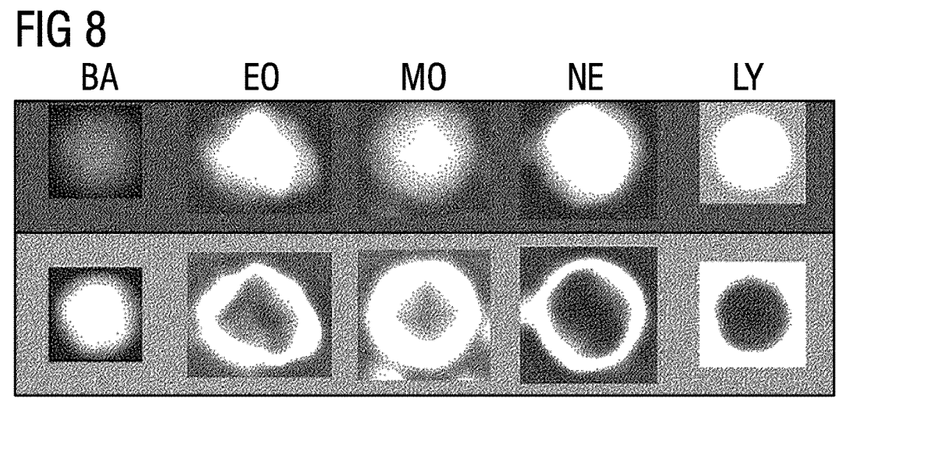

FIGS. 6-8 show exemplary images of different WBC cell types acquired with varying objective NA, illumination NA, and illumination wavelength corresponding to different physical depth of fields and lateral resolutions.

In FIG. 6 reconstructed transmission images in both the top and bottom row are shown for basophils (BA), eosinophils (EO), monocytes (MO), neutrophils (NE) and lymphocytes (LY) at an objective NA of 1.3, illumination NA of 0 (planar wave), a low coherence at 532 nm wavelength, and a depth of field of ~1 μm.

Images of the same cell types are shown in FIG. 7 at an objective NA of 0.55, illumination NA of 0.4, a low coherence at 530 nm wavelength, and a depth of field of ~4 μm. In FIG. 8 the images were observed at an objective NA of 0.55, illumination NA of 0 (planar wave), a low coherence at 650 nm wavelength, and a depth of field of ~6 μm.

As can be seen from FIGS. 6 to 8, the image pattern becomes feature rich due to subcellular structures mainly due to nucleus and granulae which increases the classification rate of WBC cell types with decreasing depth of field (DOF) and increasing lateral resolution.

Table 1 shows classification rates for 3 & 5-part differential classifications of white blood cells depending on numerical aperture (NA) & illumination wavelength with a fixed objective magnification of 40× using condensed light and planar wave illumination. Training of the algorithm for differentiation was performed with blood samples from 5 healthy donors. The diffraction index of the medium—a PBS buffer solution—was 1.334.

TABLE 1

Achieved classification of WBC with different DHM setups.

|  | Setup 1 | Setup 2 | Setup 3 |
|---|---|---|---|
| NA | 1.3 | 0.55 | 0.55 |
| wavelength (μm) | 0.532 | 0.53 | 0.65 |
| physical DOF (μm) | 0.8 | 4.7 | 5.7 |
| Lateral resolution (Sparrow limit; μm) | 0.2 | 0.5 | 0.6 |
| Overall classification rate 5-part Diff (%) | 91 | 85 | 75 |
| Overall classification rate 3-part Diff (%) | 94 | 90 | ~90 |

In the table, the 3-part differential (3-part Diff) refers to a differentiation of lymphocytes, monocytes and granulocytes, whereas the 5-part differential (5-part Diff) refers to a differentiation of lymphocytes, monocytes, neutrophils, eosinophils, and basophils.

To achieve an overall accuracy >75% a physical depth of field (DOF) of <5.7 μm (corresponding to slice height of the cells in focus) is needed. Overall Accuracies >85% have been observed at a DOF<4.7 μm.

Pairwise discrimination of eosinophil and basophil cells as high as 100% are observed, which is unique for a label-free methodology. Such high accuracies were obtained independent of the wavelength of the light source with unfixed & unstained cells, which have been enriched to >90% by negative depletion using immunomagnetic cell separation (cells of interest are not labeled and remain in suspension after depletion of the unwanted magnetically labeled cells). For "in-vivo", native leukocyte morphology information the EDTA blood samples should preferably not be older than max. 24 h. In this case the quality can be maintained for the training of image algorithm. For the shown 5 & 3 part Diff results in the Examples the time from blood drawing to DHM imaging was always less than 8 h.

Table 2 highlights main morphological differences of WBC which can be used to discriminate between cells. Subcellular components changing the refractive index are thereby expected to affect the "physical" optical thickness.

TABLE 2

Morphological differences of WBC

| WBC type | Ratio nucleus/ cytoplasma | Nucleus features | Granulae density | Cell size |
|---|---|---|---|---|
| Lymphocyte | Medium to low | Round to kidney-shaped | None | Small to medium |
| Monocyte | High | Kidney-shaped, bulging or segmented nucleus | None | Medium to large |
| Neutrophil | Low | Band-like nucleus or 3-5 segments | Low (very fine) | Medium |
| Eosinophil | Low | 2-3 segments | High (more evenly sized) | Medium |
| Basophil | Low | 3-4 poorly defined segments | High (unevenly sized) | Medium |

Table 3 shows classification rates using different depth of fields (DOF), as above, and thus achieving different resolution. In both cases only a slice of the WBC is in focus.

TABLE 3

Classification rates of WBC with 40× objective 0.55 NA

|  | Illumination @ 530 nm | Illumination @ 650 nm |
|---|---|---|
| Basophils | 94.87% | 92% |
| Eosinophil | 91.73% | 75% |
| Monocytes | 80.7% | 87% |
| Neutrophils | 74.85% | 60% |
| Lymphocytes | 96.99% | 90% |

The novelty in the invention with respect to the setup using microchannels and DHM, and further algorithm training, is fourfold:

First, an image-based label free 5-part differential analysis of white blood cells can be performed as opposed to perming Giemsa staining to label the WBC.

Second, the use of the deep learning technology provides a rich domain of features to be used in classification as opposed to conventional hematology analyzers that depend mainly on the forward and orthogonal light scattering.

In deep learning systems, the hidden layers can extract features from the input images. Low level and high level features are extracted based on the composition of the hidden layers. Such features may be as simple as the image intensities and their statistics and can be more complex such as the formation of edges, corners etc.

Further, a large number of features can be extracted. These features do not necessarily correspond to physical characteristics of each cell but they can play an essential role in differentiating the cells.

Third, a high leukocyte differentiation accuracy (>75%) can be observed with a DOF<5.7 µm and a lateral resolution limit of <0.6 µm, which sets boundary conditions for the objective NA and the used wavelength to image the cells.

Last and most important, the leukocytes can be in an in-vivo, native condition, e.g., a room temperature stored EDTA-stabilized blood sample not older than one day. No fixation or staining has to be performed, but leukocytes are imaged directly in blood plasma or an isotonic buffer. This is a setting which is compatible with high throughput workflow (typically 60 s/sample and a statistic on all WBC from ~2 µl)).

Most important as compared to prior art is the possibility to discriminate granulocytes (neutrophils, eosinophils and basophils) which usually cannot be achieved with any other label-free method (e.g. 2-photon microscopy, conventional phase contrast microscopy, regular microscopy based on intensity values, hematology analysis by Mie scatter or impedance analysis) at present.

The invention claimed is:

1. A method for marker-free detection of a cell type of at least one cell in a medium, comprising:
   flowing a medium comprising at least one cell into a microfluidic device,
   obtaining an image of the at least one cell in the microfluidic device by a digital holographic microscopic device, wherein the image is obtained with a depth of field of less than 6 µm, and
   determining the cell type of the at least one cell.

2. The method of claim 1, wherein the image is obtained with a lateral resolution of less than 0.6 µm.

3. The method of claim 1, wherein the marker-free detection is carried out while flowing the medium comprising the at least one cell through the microfluidic device.

4. The method of claim 3, wherein the flow in the microfluidic device is at least laminar in a region wherein the image of the at least one cell is obtained.

5. The method of claim 4, wherein the microfluidic device comprises a microchannel in the region wherein the image of the at least one cell is obtained in which the laminar flow is produced by at least one sheath flow.

6. The method of claim 5, wherein surfaces of the microchannel perpendicular to a wavefront of a reference or detection beam of the digital holographic microscopic device are essentially planar.

7. The method of claim 1, wherein a field of view of the digital holographic microscopic device is at most 1.0 times a width of the microfluidic device in a region wherein the image of the at least one cell is obtained.

8. The method of claim 1, wherein the at least one cell is a blood cell.

9. The method of claim 8, wherein the blood cell is a white blood cell.

10. The method of claim 1, wherein determining of the cell type of the at least one cell is carried out using a deep learning network.

11. The method of claim 1, wherein a reference beam and a detection beam of the digital holographic microscopic device are off axis.

12. The method of claim 1, wherein the determining the cell type of the at least one cell comprises determining the cell type of the at least one cell to be one selected from the group of a neutrophil, eosinophil, and basophil.

13. A device for marker-free detection of a cell type of at least one cell in a medium, comprising:
    a digital holographic microscopic device with a depth of field of less than 6 µm;
    a microfluidic device; and
    a detection system configured to determine the cell type of the at least one cell.

14. The device of claim 13, wherein the digital holographic microscopic device has a lateral resolution of less than 0.6 µm.

15. The device of claim 13, wherein the microfluidic device comprises a microchannel in a region wherein the image of the at least one cell is obtained, wherein the microfluidic device further comprises means to produce a laminar flow in the microchannel.

16. The device of claim 13, wherein the device for marker-free detection comprises a deep learning network.

17. A method for marker-free detection of a cell type of at least one cell in a medium, comprising:
    flowing a medium comprising at least one cell into a microfluidic device;
    obtaining an image of the at least one cell in the microfluidic device by a digital holographic microscopic device; and
    determining the cell type of the at least one cell to be one selected from the group of a neutrophil, eosinophil, and basophil;
    wherein the at least one cell is unfixed and unstained,
    wherein the image is obtained with a depth of field of less than 6 µm.

18. The method of claim 17, wherein the image is obtained with a lateral resolution of less than 0.6 µm.

19. The method of claim 17, wherein a field of view of the digital holographic microscopic device is at most 1.0 times a width of the microfluidic device in a region wherein the image of the at least one cell is obtained.

* * * * *